(12) United States Patent
Ehlers et al.

(10) Patent No.: US 10,723,462 B2
(45) Date of Patent: Jul. 28, 2020

(54) SYSTEM FOR RECEIVING CARGO OR PASSENGERS IN A VEHICLE, AND A VEHICLE WITH SUCH A SYSTEM

(71) Applicant: Airbus Operations GmbH, Hamburg (DE)

(72) Inventors: Bernd Ehlers, Hamburg (DE); Stefan Behrens, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 535 days.

(21) Appl. No.: 15/453,233

(22) Filed: Mar. 8, 2017

(65) Prior Publication Data

US 2017/0275002 A1 Sep. 28, 2017

(51) Int. Cl.
*B64D 1/20* (2006.01)
*B64D 11/06* (2006.01)
*B64C 1/20* (2006.01)

(52) U.S. Cl.
CPC ............ *B64D 11/0696* (2013.01); *B64C 1/20* (2013.01); *B64D 11/064* (2014.12)

(58) Field of Classification Search
CPC ... B64D 11/06; B64D 11/0696; B64D 11/064; B64D 11/0698; B64D 11/0639; B64D 11/0046; B64C 1/20; B60N 2/02; B60N 2/36; B60N 2/0292; B60N 2002/0204; B60N 2002/0212; B60N 2002/0216
See application file for complete search history.

(56) References Cited

U.S. PATENT DOCUMENTS

| | | | | |
|---|---|---|---|---|
| 2,396,039 A | | 3/1946 | Burton et al. | |
| 2,674,300 A | * | 4/1954 | Liljengren | B64D 11/06 297/37 |
| 2,799,321 A | * | 7/1957 | Liljengren | B60N 2/242 296/64 |
| 2,861,624 A | * | 11/1958 | Reavell | B60N 2/3011 244/118.6 |
| 3,142,461 A | * | 7/1964 | Naylor | B64D 11/0696 244/137.1 |
| 3,486,204 A | * | 12/1969 | Miller, Jr. | A47C 7/002 24/606 |
| 3,578,274 A | * | 5/1971 | Ginn | B64D 9/00 24/596.1 |
| 4,005,902 A | * | 2/1977 | Balin | B60N 2/3011 108/11 |
| 4,955,973 A | | 9/1990 | Provencher | |
| 5,489,141 A | | 2/1996 | Strausbaugh et al. | |
| 2014/0007797 A1 | | 1/2014 | Rees et al. | |

(Continued)

FOREIGN PATENT DOCUMENTS

| | | |
|---|---|---|
| DE | 1005846 B | 4/1957 |
| FR | 2960514 A1 | 12/2011 |
| WO | 8100836 A1 | 4/1981 |

*Primary Examiner* — Richard G Davis
(74) *Attorney, Agent, or Firm* — Lorenz & Kopf LLP (57) ABSTRACT

An embodiment of the invention relates to a system for receiving cargo or passengers in a vehicle. The system includes a bottom beam and several functional units, wherein each functional unit includes a floor segment and a seat row with several passenger seats being attached to the floor segment. Each functional unit is assigned to a pivoting device for pivoting the functional unit relatively to bottom beam. Another embodiment of the invention relates to a vehicle having such a system.

19 Claims, 8 Drawing Sheets

(56) References Cited

U.S. PATENT DOCUMENTS

2015/0307179 A1 10/2015 Ehlers et al.
2016/0122022 A1* 5/2016 Cooke ..................... B64C 1/18
                                                    244/118.6

* cited by examiner

SYSTEM FOR RECEIVING CARGO OR PASSENGERS IN A VEHICLE, AND A VEHICLE WITH SUCH A SYSTEM

TECHNICAL FIELD

Embodiments of the invention relate to a system for receiving cargo or passengers in a vehicle. Furthermore, embodiments of the invention relate to a vehicle, in particular an aircraft, for the transport of cargo and/or passengers.

BACKGROUND

Vehicles for transport of passengers or cargo are basically known from the prior art. The vehicle may comprise a passenger cabin and a cargo hold. Usually a plurality of seat rows on which passengers may take a seat is arranged one after another in the passenger cabin. The cargo hold does not comprise any seats but rather comprises a receiving device at the bottom, e.g., with tracks and/or rolls, for guiding, attaching and/or receiving cargo.

It turned out to be desirable to use the passenger cabin for transport of cargo as needed. A first known approach for establishing space for cargo in the passenger cabin provides attaching the seat rows on a common track extending along the in longitudinal direction of the vehicle such to first loosen the seat rows and then pushing the seat rows together along the track, providing the respective free space for cargo in the passenger cabin.

However, appropriate experience shows that the approach mentioned before may provide space for cargo in the passenger cabin, but at least a re-alignment of the seat rows needs a considerable effort. Furthermore, it has been shown that the ground floor of the passenger cabin is exposed to an increased risk of damage and/or an increased wear due to receiving cargo.

BRIEF SUMMARY

Presented herein is an exemplary embodiment of a system for receiving cargo and/or passengers in a vehicle to allow a temporary receiving of cargo in a passenger cabin of the vehicle with as less conversion effort as possible and/or with as less as possible—in the best case no—wear of the ground floor region of the passenger cabin.

According to an embodiment of the invention, a system with the characteristics of claim 1 is provided. Further developments and preferred embodiments are subject of the dependent claims and the following description.

A system for receiving of cargo or passengers in a vehicle is also provided. The system comprises: a bottom beam and several functional units. Each of the functional units comprises a floor segment and a seat row being attached to the floor segment with several passenger seats. Furthermore, a pivoting device for pivoting the functional unit relatively to the bottom beam is assigned to each functional unit.

The system may form a part of a vehicle. For example, the bottom beam may be arranged in a horizontal plane in the vehicle. In a manner of a girder construction, the bottom beam may be adapted with several girders. The bottom beam may then fulfill a dual function. On the one hand, the bottom beam may serve for placing and/or attaching cargo as cargo palettes and/or cargo containers. On the other hand, the bottom beam may form a base for carrying the functional units. The functional units may be pivoted with the pivoting device such that the functional unit may lie on the bottom beam at least substantially in parallel with the respective floor segments. Each floor segment may be adapted as a in particular flat ground plate. Each pivoting device may comprise joint elements and/or a joint mechanism, which are configured for pivoting the respective functional unit. Preferably each pivoting device is adapted at least in part of the bottom beam and/or the floor segment of the respective functional unit.

The functional units and the respective pivoting device offer the further advantage, that by pivoting the functional units the respective floor segments and the respective seat rows are pivoted at the same time. In that manner, the functional units with the pivoting device may be pivoted in a for example horizontal position, which provides free access to at least a part of the bottom beam. Cargo, in particular cargo palettes and/or cargo containers may then be arranged on the part of the bottom beam which is called free, without using the floor segments and/or the seat rows of the functional units. Therefore, the inventive system allows using a passenger cabin of a vehicle for transport of cargo, without having to worry about wear or damage of the floor segments and/or the seat rows of the functional units. Only little effort is needed to provide the so called free region of the bottom beam by pivoting the functional units since each functional unit comprises a floor segment and a seat row having several passenger seats and being attached to the floor segment.

An advantageous embodiment of the system provides the seat row of each functional unit being foldable between a seating position in which the passenger seats of the seat row are appropriately usable and a compact position in which the seat row comprises a decreased external dimension with respect to the seating position. In order to use the passenger cabin of a vehicle for transport of cargo, the seat rows may be folded to their respective compact position, such that the seat rows comprise a decreased external dimension. This correspondingly applies for the functional units. Due to the decreased external dimension the functional units may be pivoted relatively to the bottom beam such that a particularly big free space for receiving cargo is generated inside the passenger cabin.

A further advantageous embodiment of the system provides that each pivoting device is adapted for pivoting a respective functional unit around a pivot axis being aligned in parallel to the bottom beam. That embodiment also covers an embodiment in which each of the pivot axes is arranged in a plane with the bottom beam. If initially the floor segments of the functional units bear on the bottom beam the previous embodiment allows that the functional units, in particular with folded seat rows, are pivotable around said pivot axis in a vertical position. The functional units may then for example be pivoted onto a side wall of the passenger cabin such that the, in particular folded, seat rows are arranged oppositely to said side wall of the passenger cabin. In this manner, a particularly big free space for receiving of cargo is generated. It is particularly advantageous if the pivot axis of each pivoting device is aligned in longitudinal direction of the vehicle and/or the passenger cabin. In this case, the functional units may be folded onto the side wall of the passenger cabin in a particularly space saving manner, which further increases the free space for receiving cargo.

A further advantageous embodiment of the system provides that with the corresponding pivoting device each functional unit is pivotable between a first pivot position of the functional unit, in which the floor segment of the functional unit bears on the bottom beam, particularly in parallel, and a second pivot position of the functional unit, in which the floor segment of the functional unit is arranged inclined or vertical to the bottom beam. Each functional unit may therefore at least be pivoted between the first pivot position and the second pivot position or vice versa, respectively. The pivoting is preferably performed around the corresponding pivot axis mentioned above. Several pivoting devices may be adapted such that the corresponding functional unit may pivot around the same common pivot axis. In the first pivot position, the floor segments bear on the bottom beam, such that the seat rows are foldable in their seating position, in order to appropriately use the passenger seats of the seat rows for transport of passengers. In order to use the passenger cabin receiving and transport of cargo, the seat rows are initially folded in their compact position. Afterwards, each of the functional units are pivoted in the second pivot position. Each of the functional unit is then arranged vertically or at least inclined to the bottom beam, respectively, having for example an angle between 70° and 110°. In the second pivot position at least a part of the bottom beam is freely accessible such that cargo may be positioned on and/or attached to that region of the bottom beam. In the second pivot position the front sides of the floor segments facing the seat rows are averted to the generated free region, wherein the ground floor of that free region is provided by the bottom beam. Correspondingly, the free region faces the back side of the floor segments, such that the front sides of the floor segments and the folded seat rows are protected from damage and/or wear when introducing cargo in the free space. This increases the life expectancy of a floor covering, for example a carpet, which may be arranged on and/or attached to the front side of the floor segment. Due to the pivotable functional units the life expectancy of the seat rows and/or a floor covering may be increased.

A further advantageous embodiment of the system provides that each functional unit with the corresponding pivoting device is lockable in at least one of the pivot positions. Each pivoting device may at least comprise a locking bolt, a locking pin, a blocking lever and/or at least another element, being adapted to lock the respective functional unit. Each functional unit may be locked with the corresponding pivoting device in for example the first pivot position, the second pivot position or in both pivot positions. Locking a functional unit in the second pivot position has proven as particularly advantageous since the functional unit is then inclined or vertically aligned to the bottom beam. The lock prevents that the functional unit pivots back by itself or by accident into the first pivot position. It is rather ensured that a functional unit being locked in the second pivot position stays in that second pivot position. This increases the safety during positioning cargo in the free space and in the passenger cabin. Furthermore, locking each functional unit in the first pivot position has proven to be advantageous in order to ensure that, for example during turbulences, the functional unit does not accidentally, by itself and/or unintentionally, pivots out of the first pivot position. This increases the safety of a vehicle when using the system.

A further advantageous embodiment of the system provides that in the first pivot position each functional unit is detachably attachable to the bottom beam. For this case, a quick fastener may be provided for each functional unit being producible with a mechanically detachable connection between the respective functional unit and the bottom beam. Due to an attachment of the functional units to the bottom beam the safety further increases when appropriately using the passenger seats since the functional units cannot unintentionally pivot out of the first pivot position. In order to enable that characteristic the functional units initially have to be detached from the bottom beam. Then, each functional unit may be pivoted from the first pivot position to the second pivot position.

A further advantageous embodiment of the system provides that each pivoting device comprises a pivot mechanism for pivoting the respective functional unit, so that each functional unit is pivotable with the respective pivot mechanism between the first pivot position and the second pivot position. Furthermore, each pivoting device comprises a linear guiding for shifting the respective functional unit along a trajectory being transverse to a pivot axis of the pivot mechanism. The pivot mechanism may then be adapted such that it provides the previously described functions and/or properties, in particular an arbitrary combination thereof, as being previously described for the pivoting device. In particular, the pivot mechanism allows pivoting the respective functional unit between the first pivot position and the second pivot position. The pivoting is performed preferably around the previously described pivot axis. Furthermore, each pivoting device comprises said linear guiding, with which the corresponding functional unit is transversely shiftable to the pivot axis of the pivot mechanism. Linear guidings are known from the prior art. Therefore, they do not need further description. The linear guiding is adapted such that the shifting is performed along a predefined trajectory. The trajectory may be straight-lined. Due to shifting a functional unit, the pivot axis of the respective pivot mechanism may be shifted along the trajectory with the functional unit. The pivot axis of the pivot mechanism is therefore not necessarily shiftable. The pivot axis may rather be formed by a joint of the pivot mechanism, wherein the joint is at least partly being formed of a slide of the linear guiding and a further joint portion on the floor segment of the corresponding functional unit. If the slide is shifted on for example a track of the linear guiding along the trajectory, then the pivot axis the respective pivot mechanism is shifted at the same time with the slide. Due to the linear guiding, the corresponding functional unit may be pulled of a side wall of the passenger cabin in order to allow pivoting the functional unit from the first pivot position in the second pivot position, without bumping with the, in particular folded, seat rows on the side wall of the passenger cabin. Furthermore, it is possible, that the functional unit being folded in a second pivot position may be shifted particularly close to the side wall of the passenger cabin with the linear guiding, so that the so called free space for receiving cargo may be adapted particularly big. On the one hand this embodiment therefore allows a collision free pivoting of the functional units. On the other hand, this embodiment provides particularly much space inside the passenger cabin for receiving cargo.

A further advantageous embodiment of the system provides that the pivot mechanism of each pivoting device is adapted such that the respective corresponding functional unit is pivotable by the pivot mechanism between the first pivot position and a further third pivot position and between the third pivot position and the second pivot position, and that the linear guiding of each pivoting device is adapted such that the respective corresponding functional unit in the first and/or the third pivot position is shiftable by the respective linear guiding between a first shifting position and a second shifting position along the trajectory. The third pivot position of each functional unit lies preferably between the first, in particular horizontal, pivot position of the functional unit and the second, preferably vertical, pivot position the functional unit. Therefore, during pivoting a functional unit from the first pivot position to the second pivot position, the functional unit passes the third pivot position. In that process the pivoting of the functional unit may be temporarily stopped in the third pivot position. It has proven advantageous that starting from the first pivot position the third pivot position is in a pivot angle range between 5° and 45°. With other words a functional unit may be lifted a bit from the first pivot position in order to bring the functional unit into the third pivot position. Furthermore, it is provided that each functional unit is shiftable by the linear guiding to the first or third pivot position transverse to the pivot axis of the respective pivot mechanism. In that process the trajectory determine the way of the shift from the first shifting position to the second shifting position, or vice versa. It has proven advantageous that by increasing the distance of each functional unit to a side wall of the passenger cabin, usually being formed by a cabin lining by shifting the functional unit from the first shifting position to the second shifting position such that thereupon the pivoting of the functional unit in the second pivot position is enabled without a collision with the side wall of the passenger cabin. By shifting the functional unit from the first shifting position to the second shifting position, the pivot axis of the respective pivot mechanism may be shifted a predetermined distance along the trajectory, wherein the distance corresponds to at least a construction height of a folded seat row. This ensures that the previously described collision between the functional unit and the side wall of the passenger cabin is prevented.

A further advantageous embodiment of the system provides, that each pivoting device is adapted such that pivoting the respective functional unit from the third pivot position to the second pivot position is blocked if the functional unit is in the first shifting position. Furthermore, it may be provided that pivoting the respective functional unit from the third pivot position to the second pivot position is, in particular only, released if the functional unit is in the second shifting position. Each of the pivoting devices may be adapted for that. Concerning the previous embodiment, it has been described that a distance of a functional unit from the side wall of the passenger cabin may be increased by shifting the functional unit from the first shifting position to the second shifting position. Due to the embodiment of the pivoting device described now it is further ensured that further pivoting the functional unit is prevented, namely in the second pivot position, if the functional unit has not been brought into the second shifting position. Otherwise, depending on the embodiment of the functional unit the folded seat row might collide with the side wall of the passenger cabin. This danger does not exist if pivoting the functional unit from the third pivot position to the second pivot position is only enabled when the functional unit is in the second shifting position. Therefore, that embodiment of the system provides a particularly safe handling.

A further advantageous embodiment of the system provides that a first end section of the floor segment of each functional unit is adapted to be foldable and the corresponding pivoting device is arranged on an opposite end section of the floor segment. Each floor segment may comprise a joint which enables folding the corresponding first end section. If a functional unit is pivoted from the first pivot position to the second or third pivot position the first end section of the floor segment may be folded in order to decrease a length of the floor segment or the dimensions of the floor segment, respectively. This is a particular advantageous case if a ceiling height in a passenger cabin is limited and if there is the danger that the floor segment without having a folded end section touches the ceiling of the passenger cabin during pivoting which might damage that ceiling.

A further advantageous embodiment of the system provides that arranging the functional units one after another in their first pivot position such that the respective floor segments form a flat floor area with their front sides, the flat floor area facing the seat rows. A front side of a floor segment is therefore that side of the floor segment which faces the respective seat row. If by pivoting the functional unit to the first pivot position the floor segments bear on the bottom beam the floor segments may be arranged in a common plane. Each two neighboring floor segments adjoin preferably directly. In this manner a common floor area being flat is formed. The passengers may walk safely to their respective seat on that floor area. Furthermore, the flat floor area enables a cleaning of the floor area. Furthermore, it has proven advantageous that no parts of the bottom beam protrude from between adjoining floor segments to the floor area such that further an unevenness in the floor area resulting from that protrusion is prevented. Since the bottom beam does not form a part of said floor area the bottom beam may further comprise a predetermined surface structure being particularly advantageous for storing cargo.

A further advantageous embodiment of the system provides that the functional units are arranged one after another in their second pivot position such that the respective floor segments form a protection wall for the seat rows with their back side. A back side of a floor segment is that side of the floor segment being averted from the respective seat row. If a functional unit is therefore pivoted from the first pivot position to a second, preferably vertical, pivot position, the back side of the floor segment may function as a side wall section for the free space being available in this case in the passenger cabin for receiving cargo. The back side of the floor segment protects the seat rows and/or where required a side wall of the passenger cabin from damage and/or wear. The back side of the floor segments are preferably arranged one after another such that they for a common, in particular flat, wall area. This increases the protection of the seat rows and/or the side wall of the passenger cabin from damage and/or wear. Furthermore, it may be prevented that cargo unintentionally gets stuck on a front edge of a floor segment because the floor segments preferably are arranged edge to edge if the respective functional units are in their respective second pivot position.

A further advantageous embodiment of the system provides that each functional unit comprises a vertically adjustable carrier device for attaching the respective seat row to the respective floor segment, such that the seat row is adjustable by the carrier device between a first, extended seat support position and a second, retracted seat support position. Using the carrier device, a seat row preferably already being in the compact position may also be moved to the floor segment by adjusting the carrier device to the second retracted seat support position. The carrier device may then comprise a folding mechanism and/or other means such that the carrier device is adjustable from the first seat support position to the second seat support position, or vice versa. Adjusting may in particular mean folding. Further adjusting mechanisms may alternatively or additionally be provided in order to decrease the distance between the seat row itself and the respective floor segment. Summarizing, it may be asserted that with the foldable seat row and the height adjustable carrier device the exterior dimensions of the functional unit may be considerably reduced, which is preferably carried out in the case when the functional unit is intended to be pivoted from the first pivot position to the third or second pivot position. If that has been carried out, a more compact functional unit may be pivoted to for example the second pivot position such that a still larger free space in the passenger cabin for receiving cargo is offered.

A further advantageous embodiment of the system provides that the bottom beam comprises a receiving device, for example with several tracks and/or several rolls, for receiving, guiding and/or attaching cargo palettes and/or cargo containers, respectively. Using the receiving device, being preferably adapted and/or arranged on a surface facing the functional units a cargo palette and/or a cargo container may particularly simply be positioned, shifted and/or arranged inside the free space being provided for the cargo inside the passenger cabin. For example, initially a cargo container may be put on the bottom beam or rather the functional unit and by using the functional unit further be shifted to the predetermined position for the final placement inside the passenger cabin. This simplifies the logistics for the receiving cargo inside the vehicle or rather the passenger cabin.

According to a second aspect the object being mentioned in the beginning may be solved with a vehicle, in particular an aircraft, for transport of cargo and/or passengers, wherein the vehicle comprises a vehicle body, in particular a fuselage, with an inside space for cargo or passengers and a system as described above. In this case the floor of the inside space is at least partially formed from the bottom beam and/or the floor segments of the functional units. For such a vehicle the in particular preferable, characteristics, effects and advantages, previously referred to apply in an analogous manner as they are described in connection with the system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and application possibilities of the present subject matter may arise from the following description of the embodiments and the figures. Thereby, all descriptively and/or figuratively shown characteristics alone and in arbitrary combination, respectively, form the subject matter independently of their composition in the single claims or their references. In the figures, the same reference signs represent the same or similar objects.

DETAILED DESCRIPTION

Figure 1:
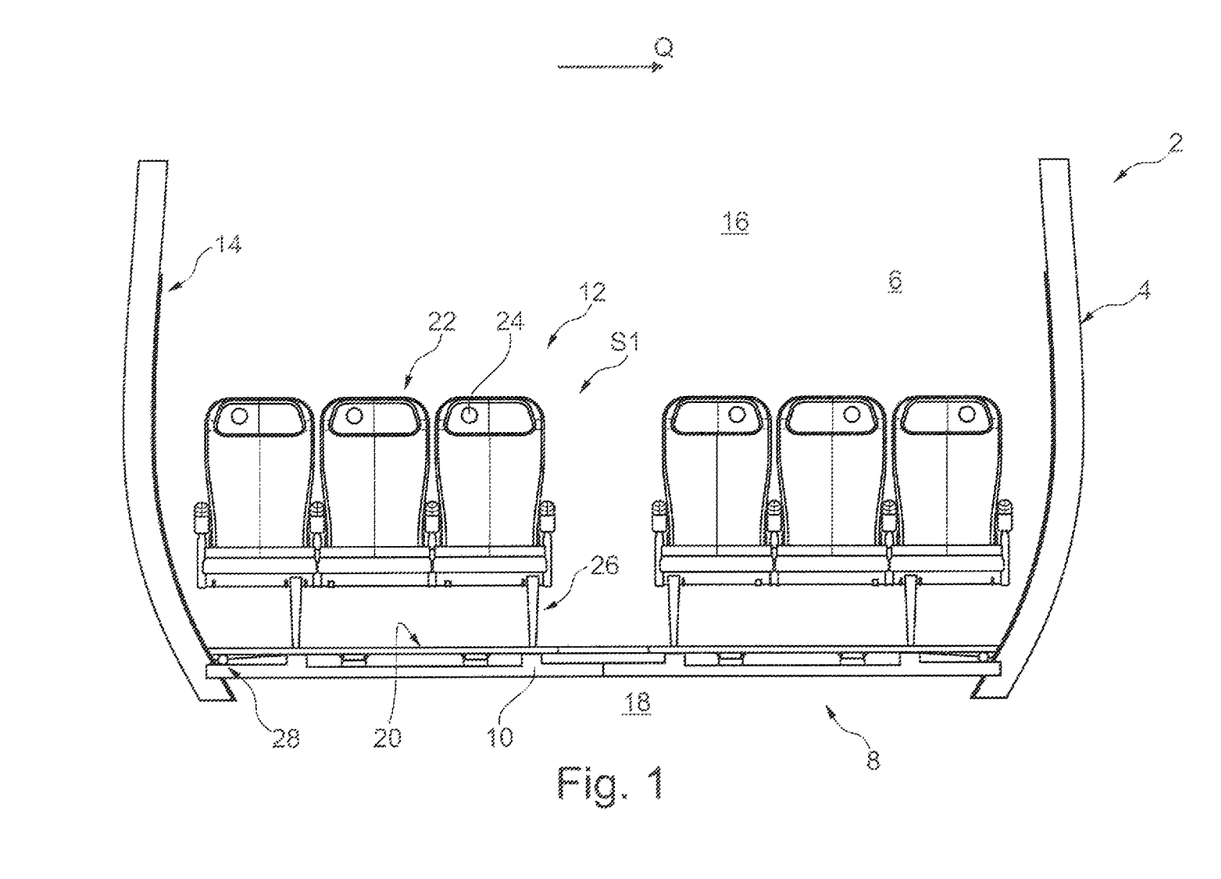
FIG. 1 shows a schematic sectional drawing of a section of a vehicle cabin with an exemplary embodiment of a system as disclosed herein.

FIG. 1 shows a section of an aircraft 2 in a schematic sectional drawing. The aircraft 2 shall be considered as an exemplary embodiment of a vehicle. The following explanation may therefore refer to another vehicle as an aircraft in an analogous manner, although in the following it will be referred to an aircraft 2. The aircraft 2 comprises a fuselage 4 with a passenger cabin. The passenger cabin comprises a passenger compartment 16 for passengers. Furthermore, a system 8 for receiving cargo or passengers in the aircraft 2 is provided for the aircraft 2. The system may also be understood as an arrangement of component parts. The system 8 comprises a bottom beam 10 and several functional units 12. The bottom beam 10 may be adapted one-pieced or segmented. The bottom beam is preferably adapted as a rigid carrier construction. The bottom beam 10 extends preferably in transverse direction Q between opposite internal sides 14 of the fuselage 4. In the aircraft 2 the bottom beam 10 is arranged preferably between the passenger compartment 16 and a cargo hold 18. As shown in FIG. 1, the cargo hold 18 is usually arranged below the cabin 16. Thus, an interior space 6 of the aircraft 2 may form the passenger compartment 16 and the cargo hold 18. The bottom beam 10 serves for carrying load. The functional units 12 may bear on the bottom beam 10 at least in a respective first pivot position S1, as it is shown as an example in FIG. 1. In that case the bottom beam 10 carries the functional units 12. The functional units 12 are arranged in the passenger compartment 16 of the aircraft 12. Therefore, the passenger compartment 16 preferably serves for receiving and for transport of passengers.

The system 8 comprises several functional units 12. Each functional unit 12 comprises a floor segment 20 and a seat row 22 attached to the floor segment 20 wherein the seat row 22 comprises several passenger seats 24. Each seat row 22 is attached to a respective floor segment 20 preferably by a height adjustable carrier device 26. It is basically possible that several seat rows 22 are attached on each floor segment 20. Even if it is described in the following that a seat row 22 is attached to the floor segment 20 the previous and the following explanations apply in an analogous manner for the case that several seat rows 22 are attached to a floor segment 20. Several seat rows 22 may then be assigned to one respective functional unit 12. Furthermore, it is possible that each seat row 22 is attached to the floor segment 20 of the respective functional unit 12 by a respective carrier device 26.

Each functional unit 12 is assigned to a pivoting device 28 being adapted to pivot the respective functional unit 12 relatively to the bottom beam 10. A pivoting device may also be called pivoting apparatus. Each pivoting device 28 is preferably formed from at least a part of the respective functional unit 12 and/or at least a part of the bottom beam

10. Thus, a joint element may be formed on each floor segment 20, forming a part of the respective pivoting device 28.

Figure 2:
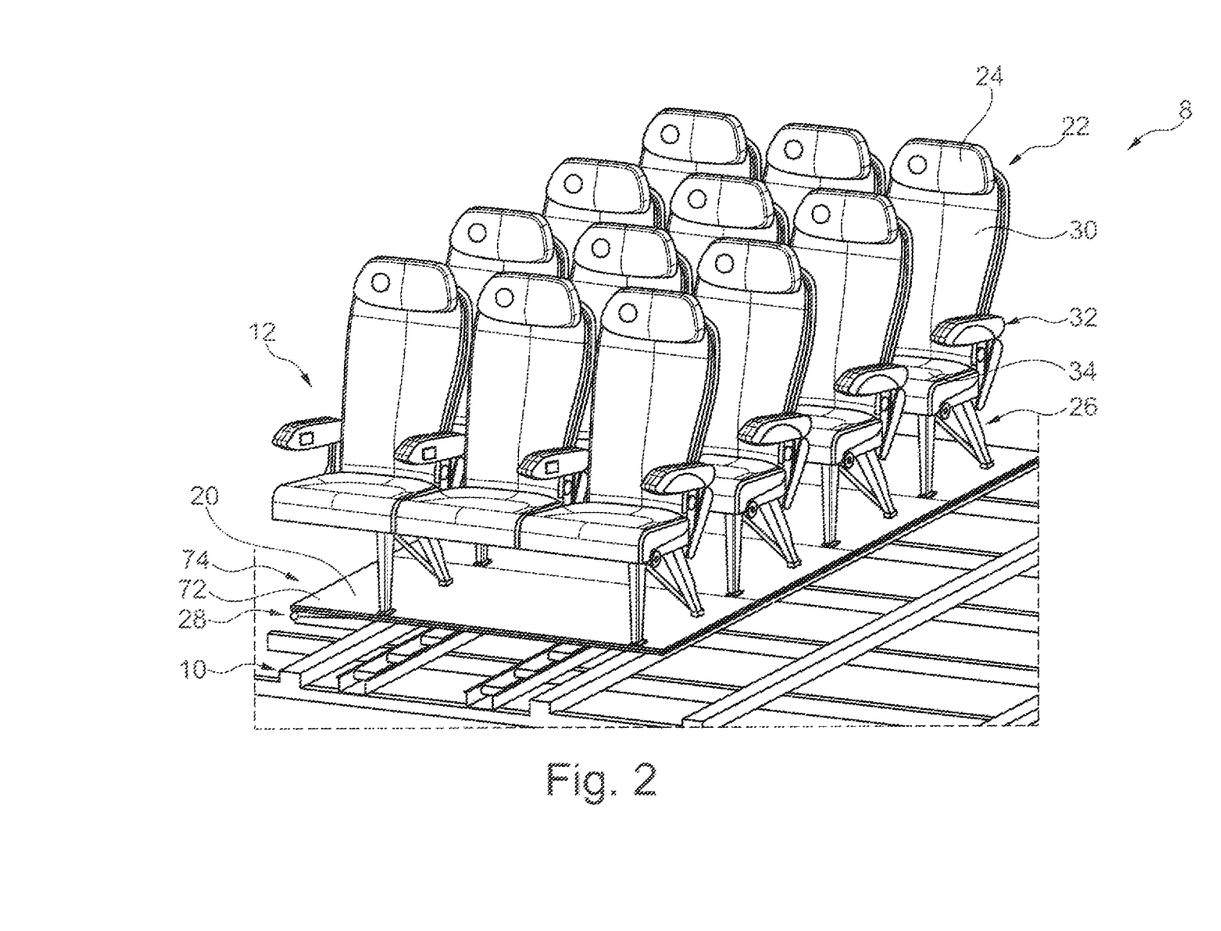
FIG. 2 shows a schematic perspective view of the system with functional units in the first pivot position.

In FIG. 2 the system 8 is shown in a schematic perspective view as being explained above with respect to FIG. 1. It is referred to the explanations mentioned above. From FIG. 2 it may be seen that the floor segment 20 is preferably adapted as a plate shaped element. The floor segment 20 may therefore also be called ground plate.

Basically the system 8 serves to receive passengers or cargo. In FIG. 2 is shown a configuration of the system 8, in which the system 8 serves for receiving passengers. The passengers may take a seat on the seats 24 of the seat rows 22 in order to be transported by the aircraft 2.

Practically, in case of a low capacity utilization of a passenger flight the need exists to transfer the aircraft 2 to another configuration of the system 8 which enables receiving cargo. In other word it is desirable to use the passenger compartment 16 for receiving cargo as needed. According to the following explanations to FIGS. 3 to 8 it will be made clear how the passenger compartment 16 is changeable by the system 8 from a configuration for receiving passengers to a configuration for receiving cargo.

Figure 3:
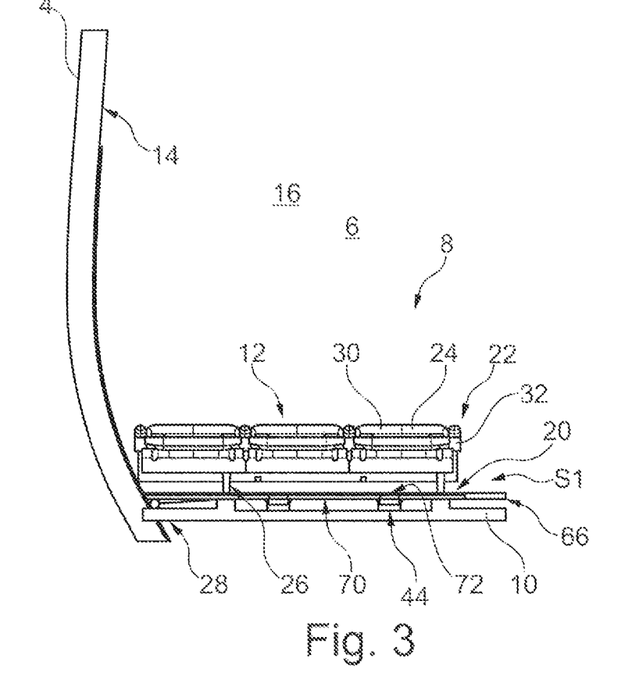
FIG. 3 shows a schematic sectional drawing of the system with a functional unit in the first pivot position, wherein the corresponding seat row is in the compact position.
Figure 4:
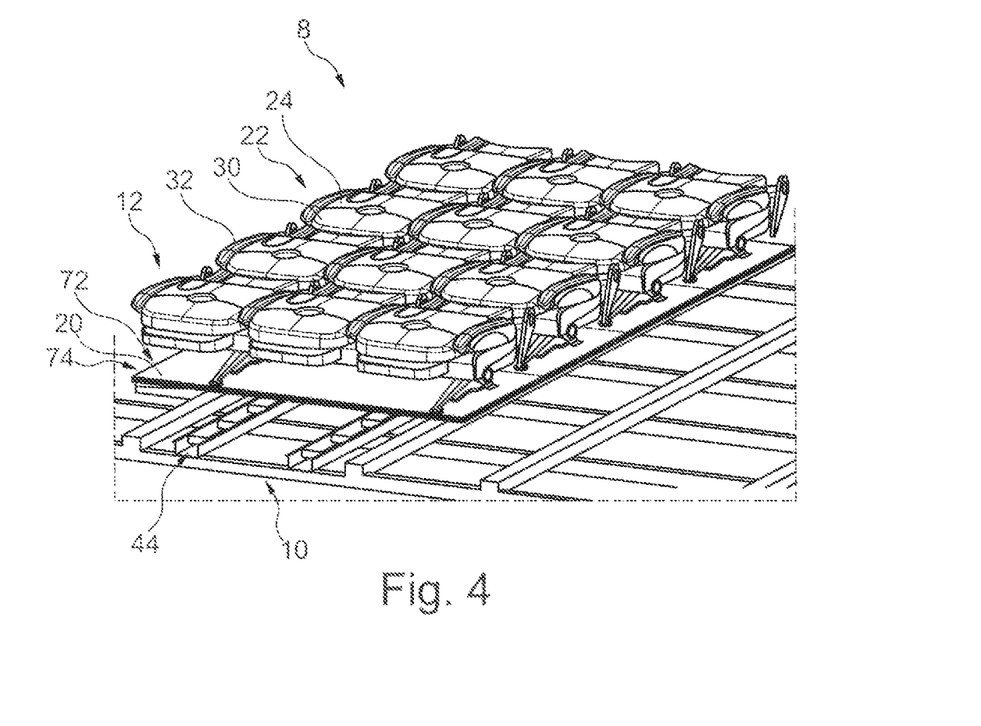
FIG. 4 shows a schematic perspective view of the system with functional units in the first pivot position, wherein the respective seat rows are in the compact position.

FIG. 3 shows a section of the aircraft 2 with a section of the system 8 in a schematic cross sectional view. The analogous system 8 is shown in a schematic perspective view in FIG. 4. From FIGS. 3 and 4 it may be seen that the passenger seats 24 are adapted as foldable seats. Each seat row 22 is therefore adjustable between a seating position, as shown in FIGS. 1 and 2 and as being formed for appropriate use, and a compact position, as shown in FIGS. 3 and 4, in which the seat rows 22 comprise a decreased external dimension with respect to the seating position. The adjustment may for example be performed by folding parts of the respective passenger seats 24. The passenger seats 24 are preferably adapted to be foldable. In this manner, the seat backs 30 and the arm-rests 32 may be folded towards the seating 34 of a passenger seat 24, that each passenger seat 24 comprises a particularly small external dimension, i.e. being particularly compact. Furthermore, the comparison of FIGS. 3 and 4 with FIGS. 1 and 2 shows that each of the seat rows 22 with the respective carrier mechanisms 26 is adjustable at least between a first, extended seat support position, as shown in FIGS. 1 and 2, and a second, retracted seat support position, as shown in FIGS. 3 and 4. The carrier mechanisms 26 may be adapted to be a foldable and/or a clapable carrier mechanisms 26. Its bearing parts may be adjusted relative to each other such that they allow for a height adjustment of the seat rows 22 relatively to the respective floor segment 20. By folding the seat rows 22 and adjusting the carrier mechanisms 26 in the second, extended seat support position each functional unit 12 gets a particularly compact shape with particularly small exterior dimensions. During folding the seat rows 22 and adjusting the carrier mechanisms 26 to the respective second extended seat support position the respective assignment of a seat row 22 and a carrier mechanism 26 to the respective floor segment 22 or to the respective functional unit 12 is sustained, respectively. Each functional unit 12 being unchanged in its compact form is then particularly well manageable to allow pivoting.

Figure 5:
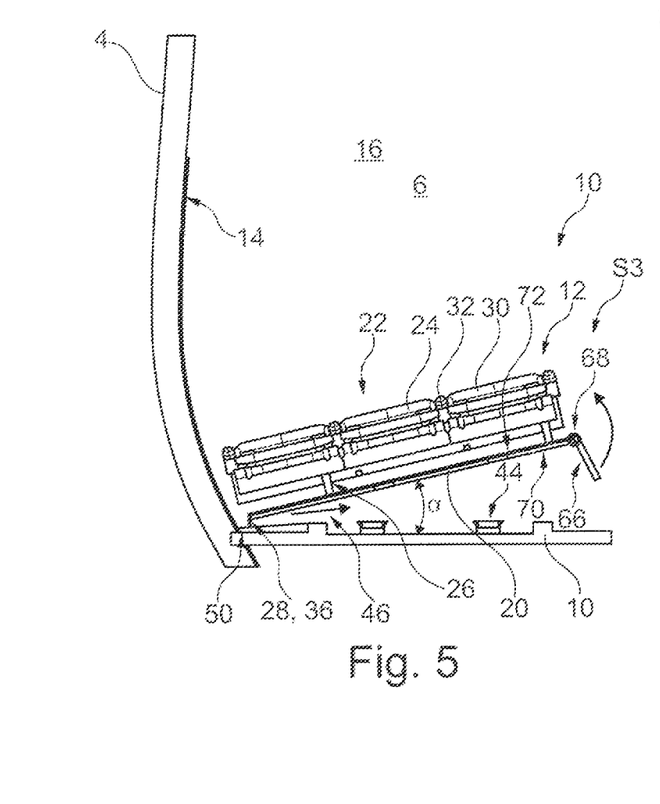
FIG. 5 shows a schematic sectional drawing of the system with a functional unit, being in the exemplary third pivot position.
Figure 6:
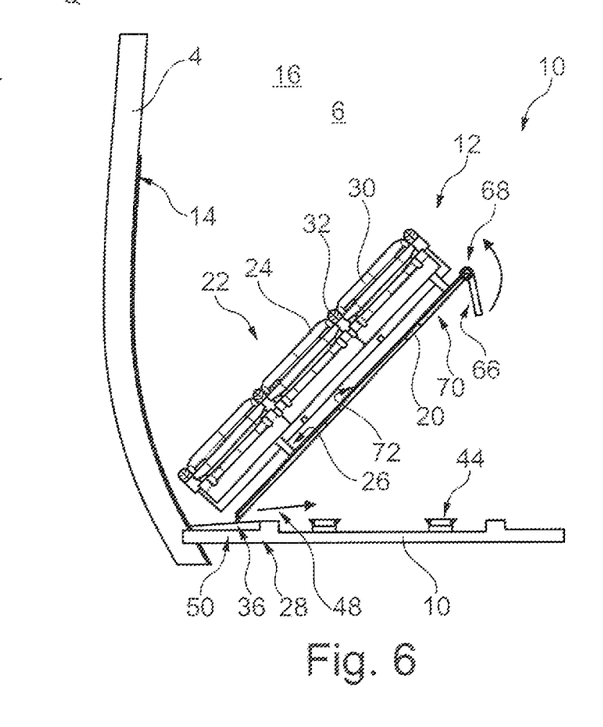
FIG. 6 shows a schematic sectional drawing of the system with a functional unit, being in a further pivot position.

In order to transfer the system 8 from a configuration for receiving passengers to a configuration for receiving cargo the functional units 12 have to be pivoted. Each pivoting device 28 is therefore adapted to pivot a respective functional unit 12 around a, preferably parallel to a pivot axis 36 being aligned to the bottom beam 10. Thereby, it has proven advantageous, if the pivot axis 36, as for example shown in FIGS. 5 and 6, is aligned to a longitudinal direction L of the aircraft 2 or to the bottom beam 10, respectively. From a schematically indicated common coordinate system being shown in FIGS. 5 and 6 it may be seen that the longitudinal direction L is aligned vertically to a transverse direction and a height direction H of the aircraft 2 or the bottom beam 10, respectively. Therefore, each pivoting device 28 may at least form the function of a rotational joint in order to allow said pivoting. In an embodiment of the pivoting device 28, the pivoting device 28 is adapted to be a rotational joint. From the synopsis of FIGS. 3 and 5 it may be seen that the functional unit 12 is pivoted around the pivot axis 36 such that the folded passenger seats 24 of the seat row 22 is pivoted towards the inner face 14 of the fuselage 4.

Figure 7:
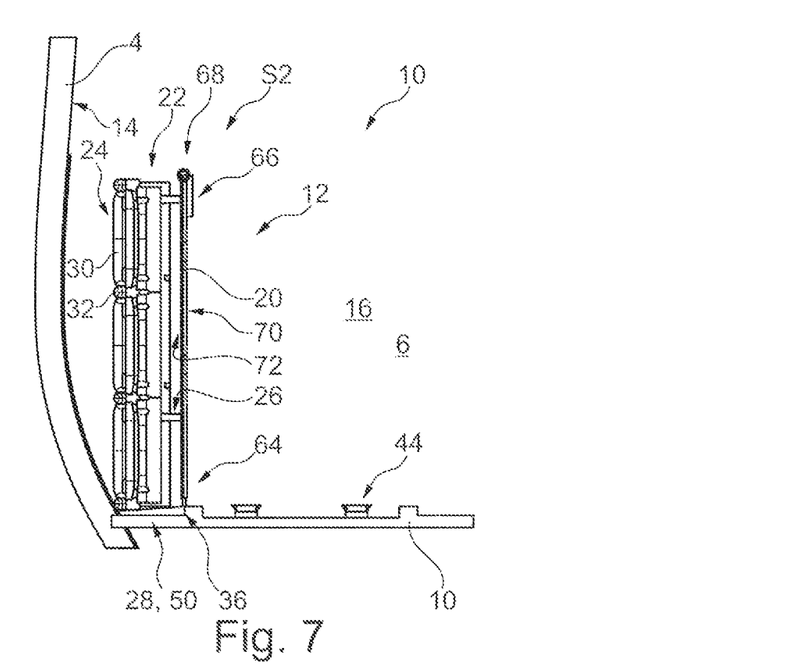
FIG. 7 shows a schematic sectional drawing of the system with a functional unit, being in the exemplary, second pivot position.

From FIGS. 6 and 7 showing a respective schematic cross section of a part of the aircraft 2 with a part of the system 8, the further process of the pivoting motion of a functional unit 12 may be extracted. Additionally, from the synopsis of FIGS. 3 to 7 may be seen that each functional unit 12 is pivotable by the respective pivoting device 28 between a first pivot position S1 of the functional unit 12, as exemplary shown in FIG. 3, in which the corresponding floor segment 20 bears on the bottom beam 10 and in parallel to the bottom beam 10, and a second pivot position S2, in which the corresponding floor segment 20 is arranged vertically to the bottom beam 10. In particular, in the second pivot position S2 each the functional units 12 is lockable by the respective pivoting device 28 or by another auxiliary means, respectively. This prevents that each functional unit 12 unintentionally pivots back into the first pivot position S1.

Figure 8:
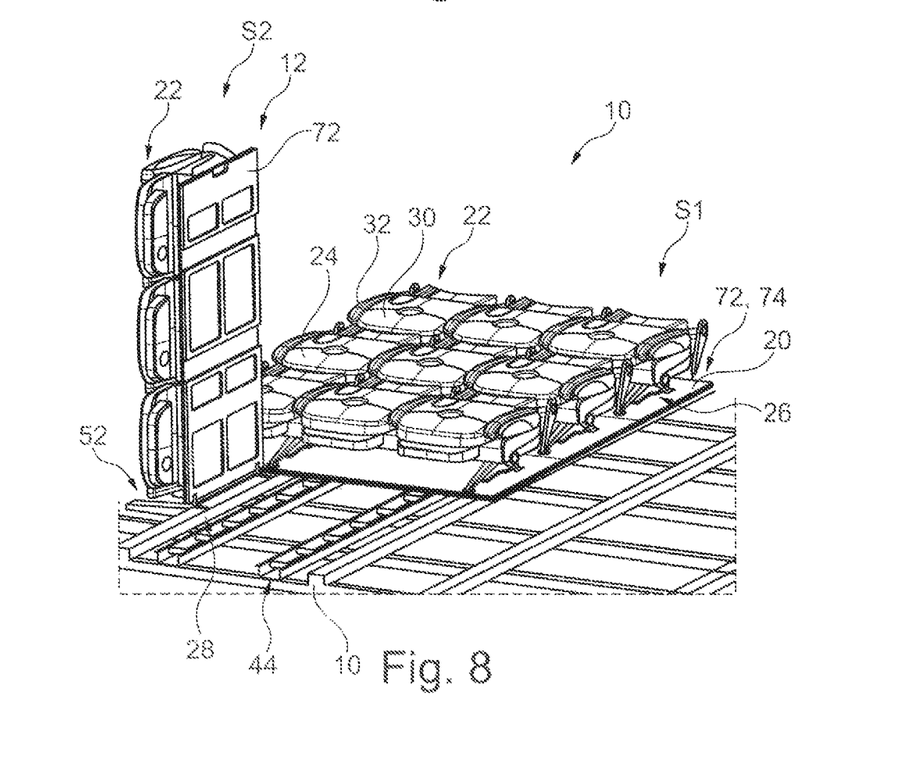
FIG. 8 shows a schematic perspective view of the system with a functional unit in the second pivot position and further functional units in the first pivot position.

In FIG. 8 a schematic perspective view of a part of the system 8 is shown. From FIG. 8 may be seen that each functional unit 12 is pivotable separately, i.e. in particular independently from the further functional units 12. Thus, the functional units 12 may be pivoted on after another from the respective first pivot position S1 to the second pivot position S2.

Figure 9:
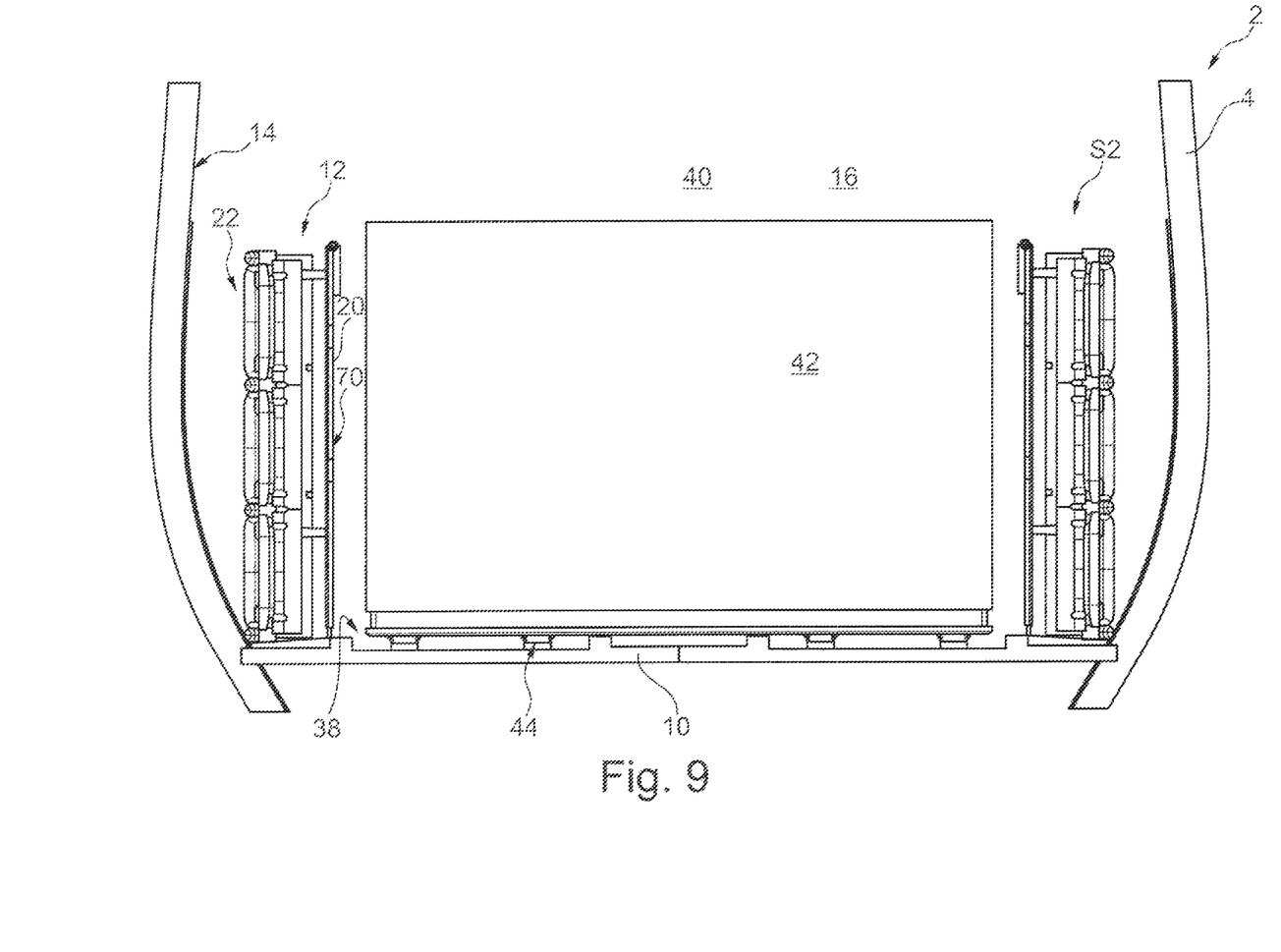
FIG. 9 shows a further, schematic sectional drawing of the section of the vehicle cabin with the system, wherein the functional units are in the second pivot position.

FIG. 9 shows a part of the aircraft 2 with a part of the system 8 in a schematic cross sectional view. Each inner face 14 of the fuselage 4 of the aircraft 2 comprises a functional unit 12. In this case, the functional units 12 have been pivoted to their respective second pivot position S2 such that at least a part 38 of the bottom beam 10 is accessible from above. The space above said part 38 of the bottom beam 10 therefore forms an auxiliary cargo hold 40 inside the cabin 16. That auxiliary cargo hold 40 serves for receiving cargo. A cargo container 42 may be placed in the auxiliary cargo hold 40. Different cargo may also be placed in the auxiliary cargo hold 40 instead of cargo containers 42. In order to be able to particularly easily arrange the cargo container 42 or different cargo inside the auxiliary cargo hold 40 a receiving mechanism 44 is provided to be arranged and/or to be adapted on an upper face of the bottom beam 10. The receiving mechanism 44 may, as shown in FIG. 9, comprise rolls, wherein the cargo is shiftable by the rolls inside the auxiliary cargo hold 40. The bottom beam 10 and/or the receiving mechanism 44 may further comprise other means for attaching cargo, in particular for attaching the cargo containers 42. Furthermore, it has proven to be advantageous if tracks are alternatively or additionally provided for the receiving mechanism 44, so that the receiving mechanism 44 is adapted for receiving, guiding and/or attaching cargo, in particular cargo containers and/or cargo palettes.

The previous explanation of the FIGS. 1 to 9 clarifies, that the same interior space 6 of aircraft 2 is usably adapted for receiving and for transporting passengers or for receiving and for transporting cargo by the system 8. Depending on the purpose the interior space 6 will serve, the configuration of the system 8 may be changed by pivoting the functional units 12.

In order to be able to transport an as high as possible number of passengers with the aircraft 2 in the configuration of system 8 serving for receiving passengers is it is provided that the seat rows 22 extend to the inner face 14 of the fuselage 4 leaving only a short distance to or being even proximate to the inner face 14, respectively. Even if each functional unit 12 is foldable or adjustable, respectively, to a compact external dimension, as for example shown in FIG. 3, it has proven to be advantageous to also enable a translatory motion of each functional unit 12 in addition to the pivotal motion. That translatory motion is indicated for example in FIGS. 5 and 6 by the corresponding arrows 46, 48. Each functional unit 12 is drawn from the inner face 14 of the fuselage 4 with that translatory motion in order to prevent a collision, in particular between the respective seat row 22 and the inner face 14 of the fuselage 4, during pivoting the functional unit 12. In that context it has proven to be advantageous if each pivoting device 28 comprises a pivot mechanism 50. The pivot mechanism 50 comprises the properties and advantages, as being previously explained for pivoting device 28. Particularly, the pivot mechanism 50 may be adapted in the manner of a rotational joint. The parts of the rotational joint may be formed on the one hand from the respective floor segment 20 and on the other hand from the bottom beam 10 or from a respective component, respectively. Therefore, each pivot mechanism 50 for pivoting the respective functional unit 12 is adapted such that the corresponding functional unit 12 is pivotable between the first pivot position S1 and the second pivot position S2. Furthermore, it has proven to be advantageous if each pivoting device 28 comprises a linear guiding 52 for shifting the respective functional unit 12 along a trajectory 54 transverse to a pivot axis of the pivot mechanism 50.

Figure 10:
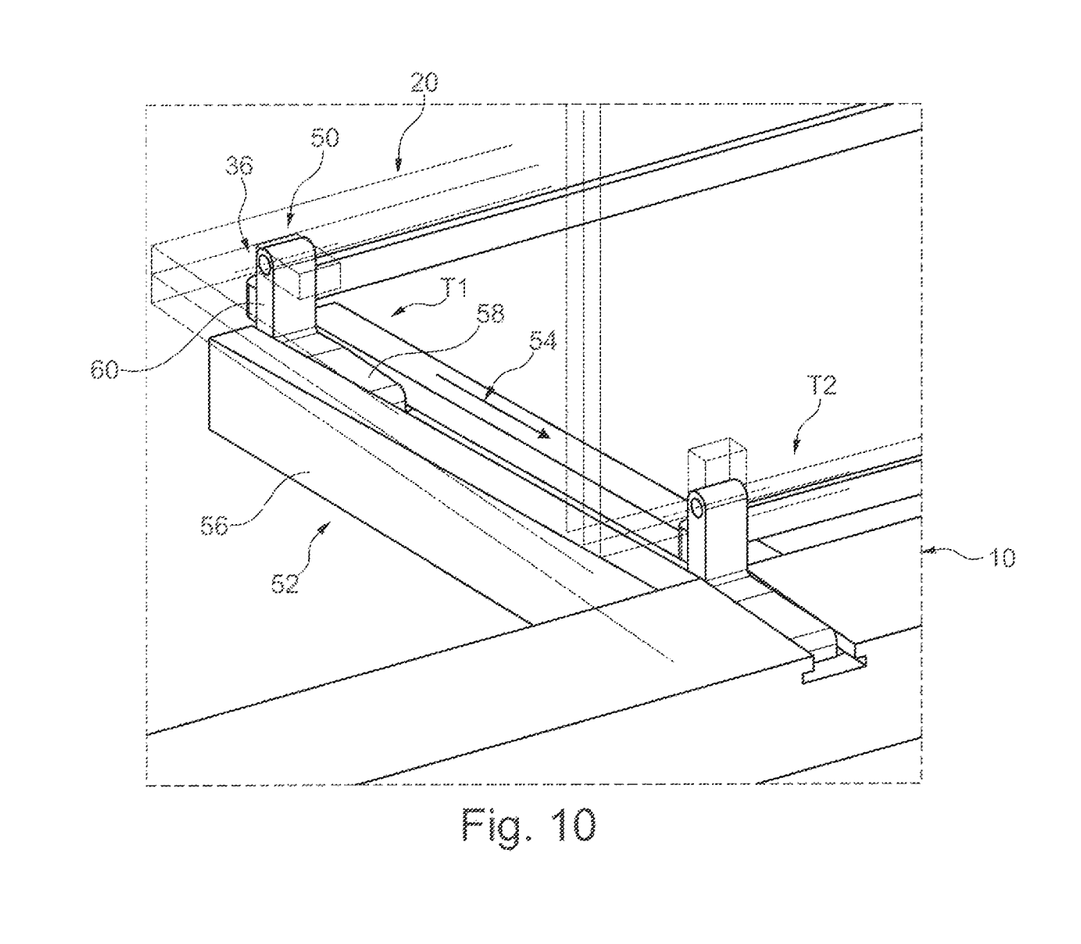
FIG. 10 shows a schematic perspective view of the pivoting device.

In FIG. 10 is shown a part of the pivoting device 28 in a schematic perspective view. The pivoting device 28 comprises a pivot mechanism 50 and a linear guiding 52. The linear guiding 52 comprises a guiding track 56 and a slide 58. The slide 58 is accommodated in the guiding track 56 such that the slide 58 or the corresponding functional unit 12, respectively, is shiftable from a first shifting position T1 along the trajectory 54 to a second shifting position T2. The trajectory 54 is indicated by the arrow being parallel to the guiding track 56. Furthermore, it is noted, that in FIG. 10, the position of the slide 58 or the functional unit 12, respectively, is shown in the first shifting position T1 as well as in the second shifting position T2. The slide 58 comprises a flange-like rotatably mounted section 60 being attached to the floor segment 20. In that manner the pivot mechanism 50 is formed. Thereby the slide 58 and the floor segment 20 may be adapted such that they form out the pivot mechanism 50 as a rotational joint such that the floor segment 20 is pivotable around the pivot axis 36. The pivoting of the functional unit 12 or the floor segment 20, respectively does not happen in the first shifting position T1 but rather in the shifting position T2. For that purpose, the functional unit 12 is drawn by the floor segment 20 from the first shifting position T1 in direction of the second shifting position T2, as shown by the synopsis of FIGS. 5 and 6. The pivot motion from the first pivot position S1 to the second pivot position S2 may be carried out during moving the functional unit 12 from the first shifting position T1 to the second shifting position T2. In order to pivot the functional unit 12 in the second pivot position S2, completely, it is necessary that the functional unit 12 is initially shifted in the second shifting position T2, in order to avoid a collision, in particular between the respective seat row 22 and the inner face 14 of the fuselage 4.

Therefore, it has proven to be advantageous, if the pivot mechanism 50 of each pivoting device 28 is adapted such that the respective corresponding functional unit 12 is pivotable by the pivot mechanism 50 between the first pivot position S1 and a further, third pivot position S3 and between the third pivot position S3 and the second pivot position S2. The third pivot position is also a pivot position between the first pivot position S1, being shown in FIG. 3, and the second pivot position S2, being for example shown in FIG. 7. The third pivot position S3 may also for example be a position of the functional unit 12, as shown in FIG. 5 or FIG. 6. For that purpose, the third pivot position S3 may be determined by a pivot angle region a, being for example between 5° and 45° around the pivot axis 36 relatively to the bottom beam 10. If a third pivot position S3 is provided the linear guiding 52 of each pivoting device 28 may be adapted such that the respective corresponding functional unit 12 being in the first pivot position, the third pivot position S3 or a further position between the first and third pivot position S1, S3 is shiftable by the respective linear guiding 50 between the first shifting position T1 and the second shifting position T2 along the trajectory 54. Furthermore, it is preferable that each pivoting device 28 is adapted such that pivoting the respective functional unit 12 from the third pivot position S3 to the second pivot position S2 is locked if the functional unit 12 is not in the second shifting position T2, but in particular in the first shifting position T1 or a shifting position between the first shifting position T1 and the second shifting position T2, respectively. Furthermore, it may be provided that each pivoting device 28 is adapted such that pivoting of the respective functional unit 12 from the third pivot position S3 to the second pivot position S2 is released only if the functional unit 12 is in the second shifting position T2. Each or a combination of the embodiments of the pivoting device 28 mentioned above ensure that a collision of the functional unit 12, in particular the respective seat row 22, with the inner face 14 of the fuselage 4 is effectively prevented. Since the functional unit 12 may be pivoted from the third pivot position S3, as shown for example in FIG. 5 or 6, to the second, preferable vertical, pivot position S2, as shown for example in FIG. 7, if by the translational shifting of the functional unit 12 sufficient space is created between the inner face 14 of the fuselage 4 and the opposite end section of the functional unit 12.

Furthermore, it has proven to be advantageous if the pivoting device 28 of each functional unit 12 is arranged on an end section 64 of the respective floor segment 20. This allows pivoting of the functional unit 12 as being clear from the synopsis of FIGS. 3 to 7. If a functional unit 12 is pivoted to the second pivot position S2 then it is preferably provided that the functional unit 12 is aligned at least substantially vertical to the bottom beam 10. In order to prevent that the floor segment 20 collides with a ceiling element of the passenger cabin, it has proven to be advantageous, if a further end section 66 of the floor segment 20 of each functional unit 12 is adapted to be foldable and the corresponding pivoting device 28 is arranged on the opposite previously mentioned end section 64 of the floor segment 20. Thereby the end section 66 may be adapted to be pivotable around a pivot axis 68 being parallel to the pivot axis 36 of the pivoting device 28. Said end section 66 may therefore be adapted to be foldable on a back side 70 of the remaining floor segment 20 such that in the second pivot position S2 the corresponding functional unit 12 comprises a reduced height. This prevents the possible above mentioned collision with a ceiling element.

In FIG. 2, the system 8 is shown in a configuration, in which the functional units 12 are in their first pivot position S1. Thereby, the functional units 12 are arranged one after another such that the respective floor segments 20 with their front sides 72 form a flat floor area 74 facing the seat rows 22. With other words, the floor area on which the passengers may walk to their passenger seats 24 may be adapted at least in part of the floor area 74 mentioned before. The front sides 72 of the floor segments 20 may therefore form a part of the ground for the passenger cabin, wherein in the corresponding configuration the system 8 serves for receiving and for transport of passengers.

Figure 11:
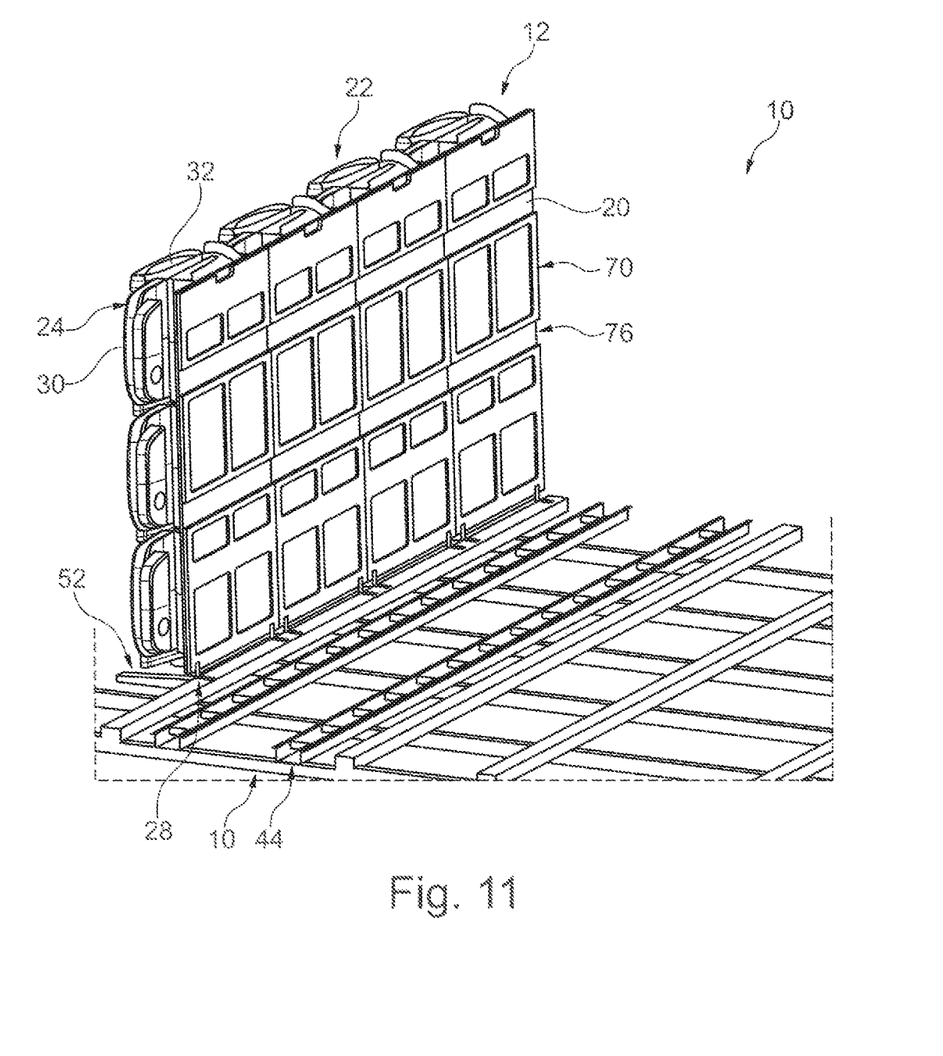
FIG. 11 shows a schematic perspective view of the system with several functional units in the second pivot position.

If the system 8 is transferred to a configuration for receiving and for transport of cargo the functional units 12 are pivoted to their respective second pivot position S2. This is shown for example in FIG. 11. FIG. 11 shows a part of the system 8 in a schematic perspective view. The back sides 70 of the floor segments 20 are then facing the auxiliary cargo hold 40, as is explained for example in synopsis with FIG. 9. In order to support placement of cargo in the auxiliary cargo hold 40 in a manner being as simple as possible and/or without any obstacles, it is advantageously provided that the functional units 12 are arranged one after another in their respective second pivot position S2 such that the respective floor segments 20 form a protection wall 76 with their back sides 70. The protection wall 76 may be determined at least in section by one or several flat planes, respectively, being formed out of the back side 70 of the several, adjoining floor segments 20. The floor segments 20 or the protection wall 76, respectively, then serves to protect the seat rows 22 and/or to protect the inner face 14 of the fuselage 4, respectively. If for example a cargo container is pushed into the auxiliary cargo hold 40 the floor segments 20 or the protection wall 76 being formed them, respectively, prevents that the cargo container 42 damages the seat rows 22 and/or the inner face 14 of the fuselage 4, respectively. Thus, the floor segments 20 may form a kind of protection wall as being provided for a regular cargo hold in an aircraft 2.

In addition, it should be pointed out that "comprising" does not exclude further elements or steps and "a" or "an" does not exclude a plural number. Furthermore, it should be pointed out that characteristics being explained with reference to one of the exemplary embodiments mentioned above, may also be used in combination with other characteristics of further exemplary embodiments mentioned above. Reference signs in the claims are not to be understood as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for receiving cargo or passengers in a vehicle, the system comprising:
a bottom beam; and
a plurality of functional units, wherein each functional unit comprises a floor segment and a seat row being attached to the floor segment and having several passenger seats, and wherein each functional unit is assigned to a pivoting device for pivoting the functional unit relative to the bottom beam.

2. The system according to claim 1, wherein the seat row of each functional unit is adapted to be foldable between a seating position, in which the passenger seats of the seat row are appropriately usable, and a compact position, in which the seat row comprises a decreased external dimension compared to the seating position.

3. The system according to claim 1, wherein each pivoting device is adapted for pivoting a respective functional unit around a pivot axis being aligned in parallel to the bottom beam.

4. The system according to claim 1, wherein each functional unit is pivotable by the corresponding pivoting device between a first pivot position of the functional unit, in which the floor segment of the functional unit bears on the bottom beam in a parallel manner, and a second pivot position of the functional unit, in which the floor segment of the functional unit is arranged inclined or vertical to the bottom beam, respectively.

5. The system according to claim 4, wherein in the first pivot position each functional unit is detachably attachable on the bottom beam.

6. The system according to claim 4, wherein the functional units are arranged one after another in their first pivot position such that the respective floor segments form a flat floor area with their front sides, wherein the flat floor area faces the seat rows.

7. The system according to claim 4, wherein the functional units are arranged one after another in their second pivot position such that the respective floor segments form a protection wall with their back side for the seat rows.

8. The system according to claim 1, wherein each functional unit is lockable with the corresponding pivoting device in at least one of the pivot positions.

9. The system according to claim 1, wherein each pivoting device comprises a pivot mechanism for pivoting the respective functional unit such that each functional unit is pivotable by the respective pivot mechanism between the first pivot position and the second pivot position, and each pivoting device comprises a linear guiding for shifting the respective functional unit along a trajectory transversely to a pivot axis of the pivot mechanism.

10. The system according to claim 9, wherein the pivot mechanism of each pivoting device is adapted such that the respective corresponding functional unit is pivotable, by the pivot mechanism between the first pivot position and a further, third pivot position and such that the respective corresponding functional unit is pivotable, by the pivot mechanism, between the third pivot position and the second pivot position, and each linear guiding of the pivoting device is adapted such that in the first and/or third pivot position the respective corresponding functional unit is shiftable by the respective linear guiding between a first shifting position and a second shifting position along the trajectory.

11. The system according to claim 10, wherein each pivoting device is adapted such that pivoting the respective functional unit from the third pivot position to the second pivot position is locked when the functional unit is in the first shifting position, and/or enabled when the functional unit is in the second shifting position.

12. The system according to claim 1, wherein a first end section of the floor segment of each functional unit is adapted to be foldable and the corresponding pivoting device is arranged on an opposite end section of the floor segment.

13. The system according to claim 1, wherein each functional unit comprises a height adjustable carrier device for attaching the respective seat row to the respective floor segment, such that the seat row is adjustable between a first, extended seat support position and a second, retracted seat support position by the carrier device.

14. The system according to claim 1, wherein the bottom beam comprises a receiving mechanism with several tracks, for receiving, guiding, and/or attaching cargo pallets or cargo containers.

15. The system of claim 1 wherein the bottom beam is selected from a plurality of bottom beams, and wherein the plurality of bottom beams are arranged in a grid structure.

16. The system of claim 1 wherein the bottom beam is a first bottom beam, wherein the system further includes a second bottom beam and a third bottom beam, and wherein the first bottom beam, second bottom beam, and third bottom beam are parallel to one another.

17. The system of claim 1 wherein:
the bottom beam is a first bottom beam;
the plurality of functional units includes a first functional unit and a second functional unit arranged collinearly;
the first functional unit is assigned to a first pivoting device for pivoting the first functional unit relative to the first bottom beam; and
the second functional unit is assigned to a second pivoting device for pivoting the second functional unit relative to the first bottom beam.

18. The system of claim 1 wherein:
the bottom beam is a first bottom beam;
the plurality of functional units is a plurality of first functional units;
the system further comprises:
a second bottom beam parallel to the first bottom beam; and
a plurality of second functional units, wherein each second functional unit is assigned to a second pivoting device for pivoting the second functional unit relative to the second bottom beam.

19. The system of claim 18 wherein the first bottom beam and second bottom beam are formed in a grid structure.

* * * * *